membrane and a thin layer of nutrient agar is then poured onto the surface of the membrane to a thickness of 1 or 2 millimeters. The nutrient agar supports bacterial growth in an incubator, and colony count or other bacteriologic processes can follow incubation.

A device formed in accordance with the present invention can also be effectively used in connection with the flotation technique for separating solid but very minute particles from a specimen. For example, in separating parasites or ova from a stool specimen, the retainer of a device embodying the present invention is filled with a salt solution of the proper specific gravity and a small amount of the stool specimen is added. The parasites and ova, being of a lighter specific gravity, rise to the top of the liquid. If a cap, such as the cap 168, is applied and the device inverted, the parasites and ova will be immediately beneath the membrane. If a vacuum is then applied through the membrane, liquid will be drawn through the membrane and draw the parasites and ova against the membrane where they will be retained for examination after the device is disassembled.

Also, chemical testing could be conducted on a liquid specimen to determine such characteristics as the pH value of the specimen by placing a suitable indicator (e.g., a piece of chemically impregnated paper) on or adjacent the membrane or within the receiving tube 26.

Various of the features of the invention are set forth in the following claims.

What is claimed is:

1. A device for separating a biological fluid specimen such as urine into liquid and solid constituents for analysis, said device comprising: plate means including a hollow needle portion defining an elongated passageway having an inlet at one end and an outlet at its opposite end, said needle portion being adapted to connect said elongated passageway to a source of vacuum, said plate means including a generally flat light transmitting plate portion provided with a grid area spaced laterally from said needle portion, a liquid transporting canal interconnecting said grid area and said elongated passageway in said hollow needle portion, a filter in sheet form supported by said grid area, said filter sheet being light transmitting impervious to the passage of the biological fluid therethrough under the influence of gravity alone but being pervious to the passage of the fluid but not solids contained in the fluid under the influence of a pressure differential created when said outlet of said elongated passageway is connected to a vacuum source, wall means defining a reservoir adapted to contain a quantity of the biological fluid specimen in fluid communication with said elongated passageway inlet through said filter sheet, said grid area being adapted to support said filter sheet in generally planar form, and means to facilitate fracturing of said plate means so as to permit said needle portion to be separated from said grid area and the portion of the filter sheet overlying said grid area to render the remaining portion of said plate means usable as a slide for the microscopic examination of solids which have accumulated on the surface of said filter sheet after the outlet of said elongated passageway has been connected in fluid communication with a vacuum source and the liquid portion of the sample has passed through said filter sheet.

2. A device in accordance with claim 1, wherein said wall defining a reservoir is proportioned so as to extend upwardly from said plate in encircling relation to said filter sheet.

3. A device in accordance with claim 1, wherein said generally flat plate portion is further provided with a rim encirclinG said grid area to which said filter sheet is attached in overlying relation to said grid area, and wherein said wall defining a reservoir is provided with a flange adjacent its lower edge adapted to overlie portions of said rim of said plate.

4. A device in accordance with claim 1, wherein means are provided for maintaining the lower portion of said wall defining a reservoir in a predetermined location relative to said filter sheet.

5. A device in accordance with claim 4, wherein said means comprises a releasable adhesive layer on the lower portion of said wall.

6. A device in accordance with claim 1, wherein means are provided for releasably securing said wall defining a reservoir in fluidtight relation to said plate.

7. A device as defined in claim 1 wherein said plate means includes a tab portion of lesser width then said generally flat plate portion, said hollow needle portion being formed integral with said tab portion and depending downwardly from the lower surface thereof, and wherein said means to facilitate fracturing of said plate means comprises a line of weakness defined between said tab portion and said flat plate portion along which said tab portion may be broken away from said flat plate portion.

8. A device for separating a biological fluid specimen such as urine into liquid and solid constituents for analysis, said device comprising: means defining an elongated passageway having an inlet at one end and an outlet at its opposite end, means at said passageway outlet adapted to connect said passageway in fluid communication with a source of vacuum, a filter in sheet form disposed adajcent said passageway, said filter sheet being impervious to the passage of the biological fluid therethrough under the influence of gravity alone but being pervious to the passage of the fluid but not solids contained in the fluid under the influence of a pressure differential created when said outlet of said passageway is connected to said vacuum source, wall means defining a reservoir adapted to contain only a predetermined quantity of the biological fluid specimen in fluid communication with said passageway inlet through said filter sheet, means including an overflow in said wall means defining a trap in communication with said reservoir for receiving a limited amount of fluid introduced into said reservoir in excess of said predetermined quantity, and means for maintaining said filter sheet in generally planar form for subsequent microscopic examination fo the solids which have accumulated on the surface thereof after the outlet of said passageway has been connected in fluid communication with a vacuum source and the liquid portion of the sample has passed through said filter sheet.

9. A device in accordance with claim 8, wherein a plate is provided for supporting said filter sheet in planar relation, said plate being provided with an open- Robert Louboutin AND
Claude Daudenarde
INVENTORS

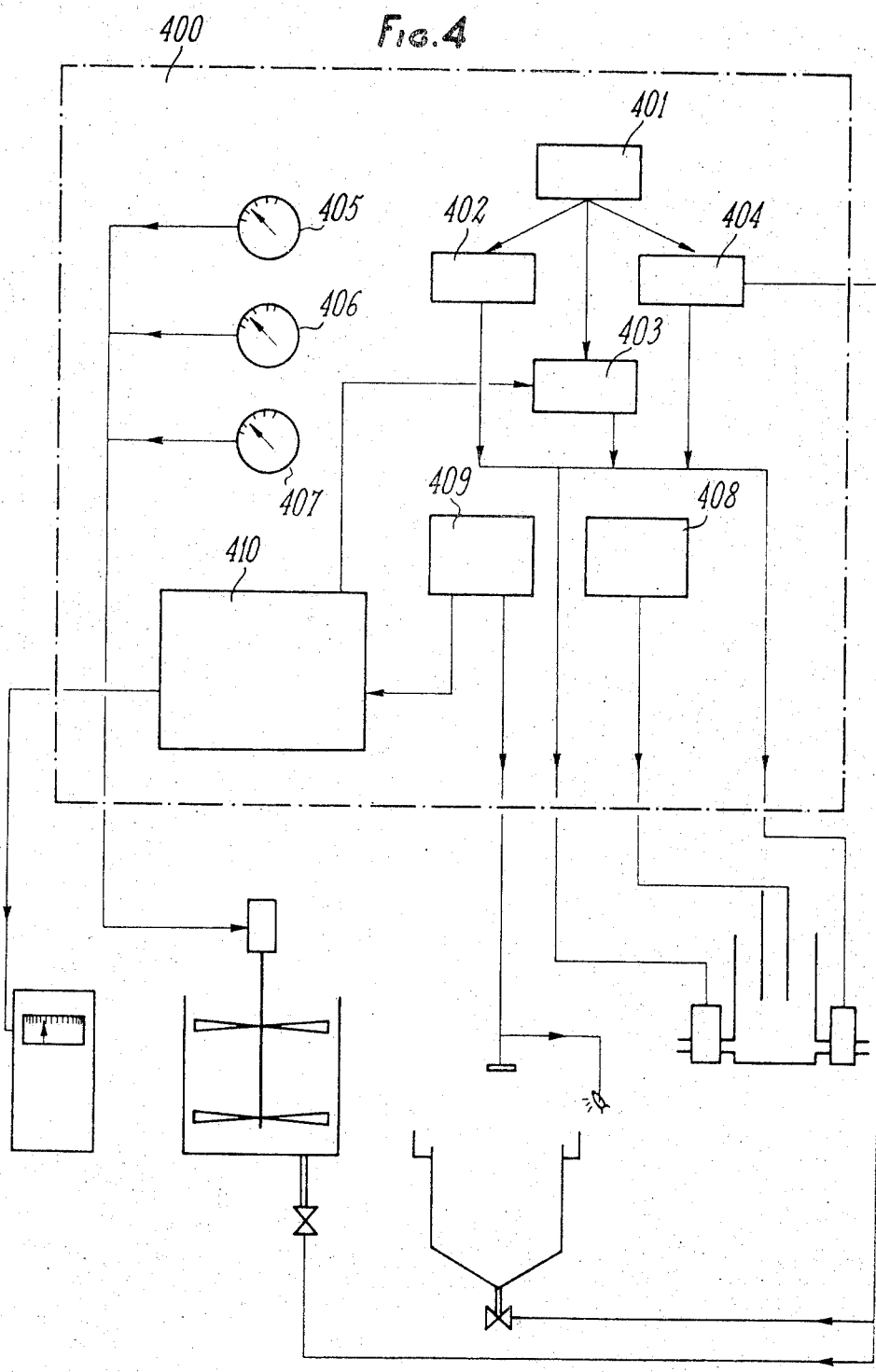

APPARATUS FOR AUTOMATICALLY DETERMINING THE OPTIMUM AMOUNTS OF REAGENTS TO BE ADDED TO A LIQUID FOR ITS CLARIFICATION

The surface water of lakes, rivers, etc. contain as a rule an infinite number of particles of very minute sizes in colloidal suspension; now these particles must be removed to make the water suitable for consumption. These particles having a certain charge, mostly electronegative, remain in a stable dispersed state and do not gather naturally in a decantable form. To obtain this decantable form a reagent, ionized in solution, also called "coagulant", may be used, which in most instances consists of a metal salt releasing ions of electropositive charge, opposed to that of colloids so as to neutralize the colloid charge; the discharged particles may thus agglomerate to form a bulky precipitate adapted to absorb in turn other inert particles in suspension. This operation is usually referred to as coagulation. It may be attended or followed immediately by a flocculation permitting the agglutination and the increment in weight of the coagulation flocks by the addition of one or more complementary reagents adapted to become effective through their inherent ionic charge. It may also be attended by a pH adjustment. Experience teaches that for a given water there is at a given moment a certain amount of reagent whereat the coagulation is more efficient: it is the amount normally conducive to a decanted water having its lowest turbidity. This optimum amount of reagent is subordinate on the one hand to the nature and quantity of the substances present either in suspension or in the dissolved state in the water: inorganic colloids, organic substances and miscellaneous salts, and on the other hand to the pH value of the water and also to its temperature. In certain cases, due account must also be taken of the fluctuations of the planktonic population and also of the degree of pollution of the water. Since surface water is likely to vary as far as the nature and concentration of the substances contained therein are concerned, it is clear that it is an imperative requirement, for permitting the distribution of water having a constantly good quality, to perform at regular intervals laboratory tests for determining the optimum amount of coagulant reagent to be added to this water in order to ensure the best possible coagulation of the colloidal substances therein.

This technique of treating liquids by coagulation, widely used for producing drinkable water by resorting to complementary treatments, is also used for treating water intended for industrial use, in the treatment of town and industrial effluents, and also in various treatments for clarifying liquids as a whole.

Experience teaches that by adding to a given volume of raw water an increasing amount of coagulant reagent there existed an optimum amount beyond which, after decantation of the flocculated precipitate, the turbidity of the supernatant water remains at its lowest rate. As a rule, adding more coagulant reagent beyond this optimum amount will not improve the quality of the supernatant water and may even, on the contrary, cause an increment in its turbidity. The optimum amount of reagent to be added to the water, for the water volume unit, designates the optimum treatment rate.

In practice, this optimum treatment rate is determined by means of a manual operation, with visual estimation of the quality of the resulting coagulation; now this operation is time-robbing and must be repeated at a frequency sufficient to enable the treatment to follow the variations occurring in the water to be treated.

Since this determination is manual and the estimation visual, the results depend mostly on the operator and on his particular method. Moreover, since it is a long and repetive one, the number of tests is frequently reduced, this involving either an excessive reagent consumption or an insufficient coagulation of the colloids and a poor quality of the water after the decantation, which may impair the quality of the water eventually distributed, at the end of the treatment.

With the apparatus constituting the subject-matter of this invention the various operations necessary for determining the optimum quantity of reagent to be added to the liquid, or, in other words, the optimum treatment rate of the liquid concerned, can be performed automatically and in a definitely reproductible and continuous manner.

The apparatus according to this invention is characterized in that it comprises a plurality of mixer vessel fed with a predetermined quantity of liquid and reagent, and wherein the mixing of said liquid and reagent is performed and followed by the separation of the resulting mixture into a decanting fraction and a supernatant fraction, means for measuring the turbidity of said supernatant fraction, said means advantageously consisting of one or a plurality of turbidimeters; and means such as computers for analyzing and comparing the measurements made in the turbidimeter or turbidimeters and thus determine the optimum amount of reagent to be added to the liquid.

Reference will now be made to the accompanying drawing illustrating diagrammatically by way of example a typical form of embodiment of the invention given by way of example and concerning more particularly the treatment of water. In the drawing:

FIG. 1 illustrates diagrammatically the various component elements and hydraulic circuits of the apparatus, which comprise essentially:

a device 101 for supplying raw or untreated water to the apparatus;

a device 102 for feeding clean water for cleaning purposes;

a set of stirring devices 103, preferably advantageously 5 in number;

a set of storage vessels 104 corresponding in number to the stirring devices;

a turbidimeter 105;

at least one set 106 of means for storing the concentrated solution of coagulant reagent, preparing and metering the diluted solution of this reagent.

According to a modified form of embodiment of this invention, a plurality of these sets of means for storing and metering the reagents may be implemented whenever the use of a plurality of reagents appear to be necessary for performing the coagulation, the flocculation and possibly the pH adjustment.

FIG. 2 shows one of the preferred forms of embodiment of this invention. Although a single stirring device and a single storage vessel have been shown in this arrangement for the sake of convenience, this figure clearly shows in detail the constitution of devices 101 and 102 for supplying untreated water and clean water to the apparatus, together with the stirring units, the storage vessels and the turbidimeters.

FIG. 4 is a diagrammatic illustration of the cabinet containing the electrical and electronic members for controlling notably the automatic and sequential operation of the apparatus.

Figure 1:
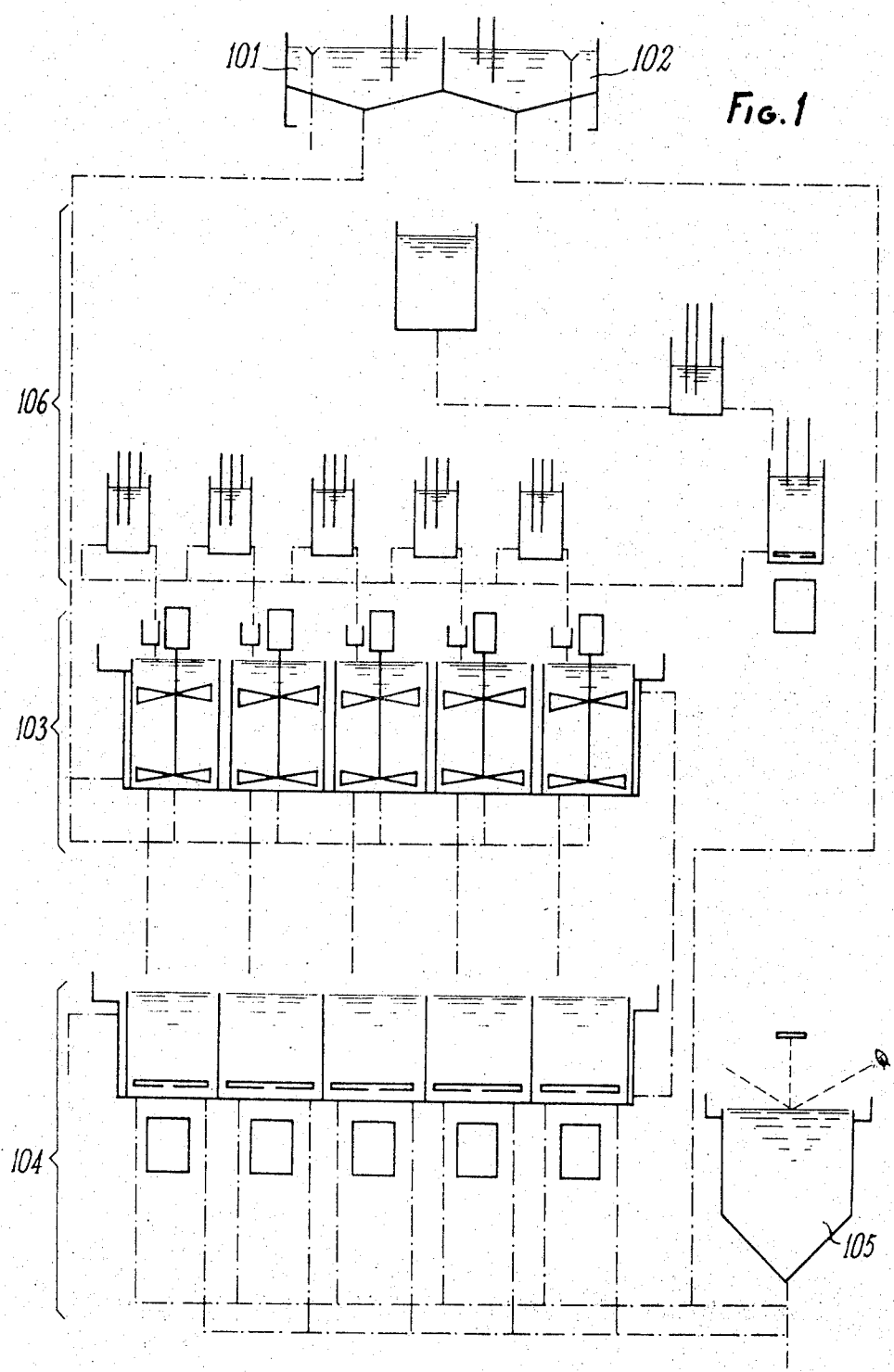
Figure 2:
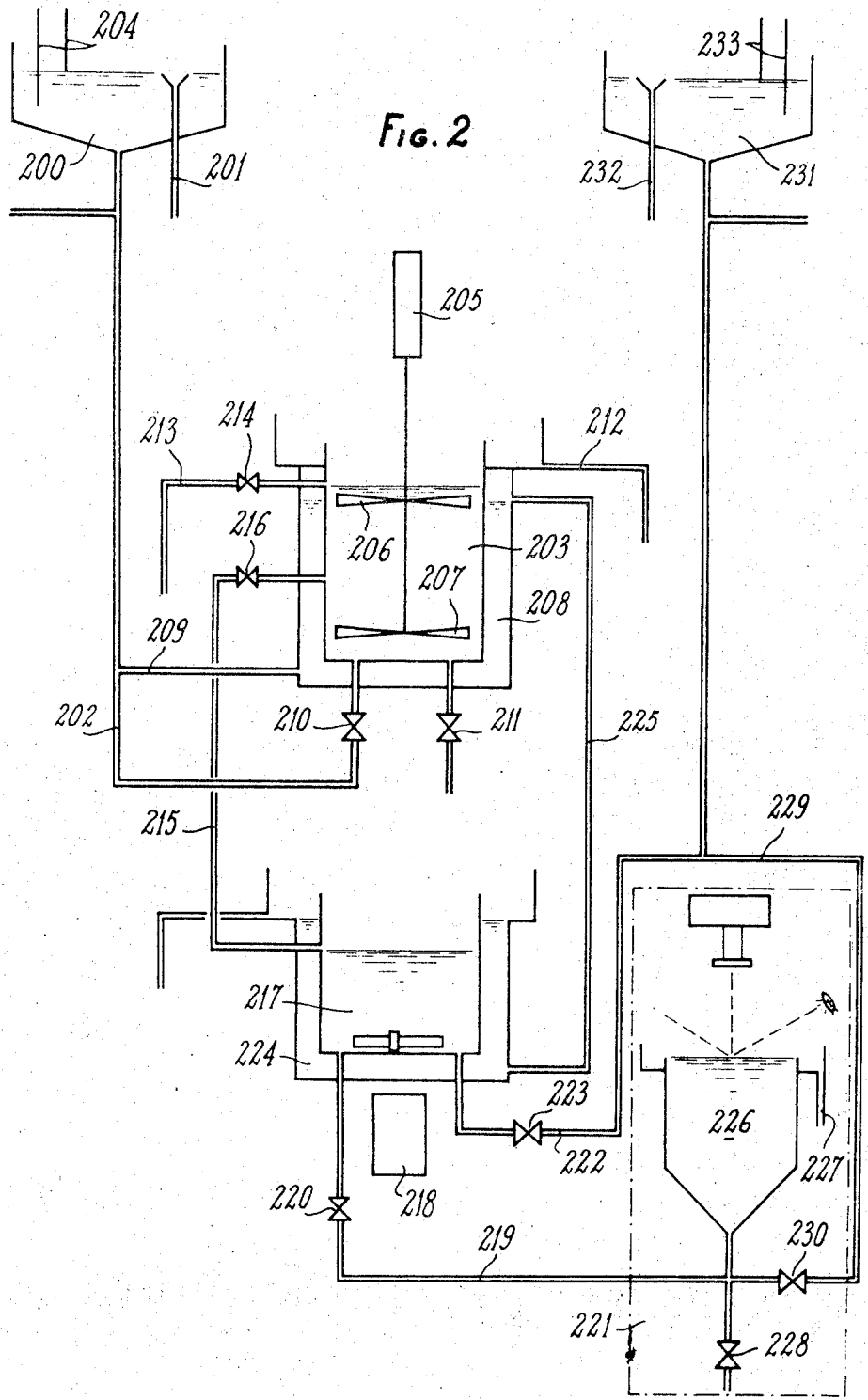

This apparatus comprises, as seen in FIG. 2, a vessel 200 equipped with an overflow device 201 to which the untreated water to be examined is fed continuously. The bottom of this vessel may advantageously be shaped to have a lowermost point from which extends a pipe 202 leading to the stirring devices 203; the vessel 200 also comprises a pair of electrodes 204 for controlling the proper supply of raw water to the apparatus. The stirring devices 203 are preferably uneven in number, for example 5, and consist of vessels preferably of cylindrical configuration in which the operation consisting in mixing the coagulant reagent with water, the flocculation and the settling are carried out. Each stirring device having a useful capacity of, say, 3 liters, is equipped with a blade-type stirrer driven from a two-speed motor 205 and advantageously provided with two pairs of stirring blades 206, 207 mounted on a common shaft. These stirring devices are mounted in a vessel or like container 208 in which water of same origin as the water being examined is fed via pipe 209 in order to prevent any heating of the water being examined and the degassing likely to result therein.

Each stirring device also comprises a inlet pipe 202 for the the water to be examined, which has a control valve 210 inserted therein, a draining pipe with another valve 211, a pair of overflow devices 212, 213 of which device 213 is closed by a valve 214, an outlet pipe 215 equipped with a valve 216 and having its inlet located somewhat above the bottom of the basin and such that the volume available between this inlet and that of overflow 213 corresponds to half the useful volume of the basin as determined by the position of overflow pipe 213, for example 1½ liters.

These stirring devices are advantageously provided with a plastic coating along their inner walls, for example epoxy resin linings, in order to minimize the retention of foreign particles and facilitate the cleaning thereof.

Pipe line 215 connects each stirring device with a storage basin 217 equipped with agitator for example of the magnetic type shown diagrammatically at 218; it also comprises an outlet pipe 219 at its bottom, which is adapted to be isolated by means of a valve 220 controlling the communication between each storage basin 217 and a turbidimeter 221, and a clean water feed pipe 222 for cleansing purpose, which is equipped with another valve 223. The set of basins 217 is contained in a large vessel 224 connected via a pipe line 225 to the vessel 208 containing the stirring devices 203 in order to ensure the circulation of water about these basins.

The turbidimeter 221 which may advantageously be of the known, socalled surface type, comprises a basin 226 having the following characteristics:

This basin, of cylindro-conical configuration, having for example a useful volume or capacity of 1 liter, is equipped with an overflow device 227, with a pipe line 219 for supplying water to be checked, which has a valve 220 inserted therein, with a draining pipe with a valve 228, and with a clean-water supply pipe for cleaning the basin 226, which comprises another valve 230.

According to this invention, the use of a surface-type turbidimeter is preferred for it is free of any optical surface likely to become soiled by contacting the water to be examined.

The clean water for cleaning the various vessels, basins and circuit means is fed to the apparatus via a constant-level reservoir 231 equipped with an overflow device 232, an outlet pipe 229 and a pair of electrodes 233 for detecting the presence of cleansing water.

The valves inserted in the raw-water and flocculated-water circuits are advantageously of the full-flow sleeve type and adapted to be actuated by using compressed air with the assistance of solenoid-operated valves.

Figure 3:
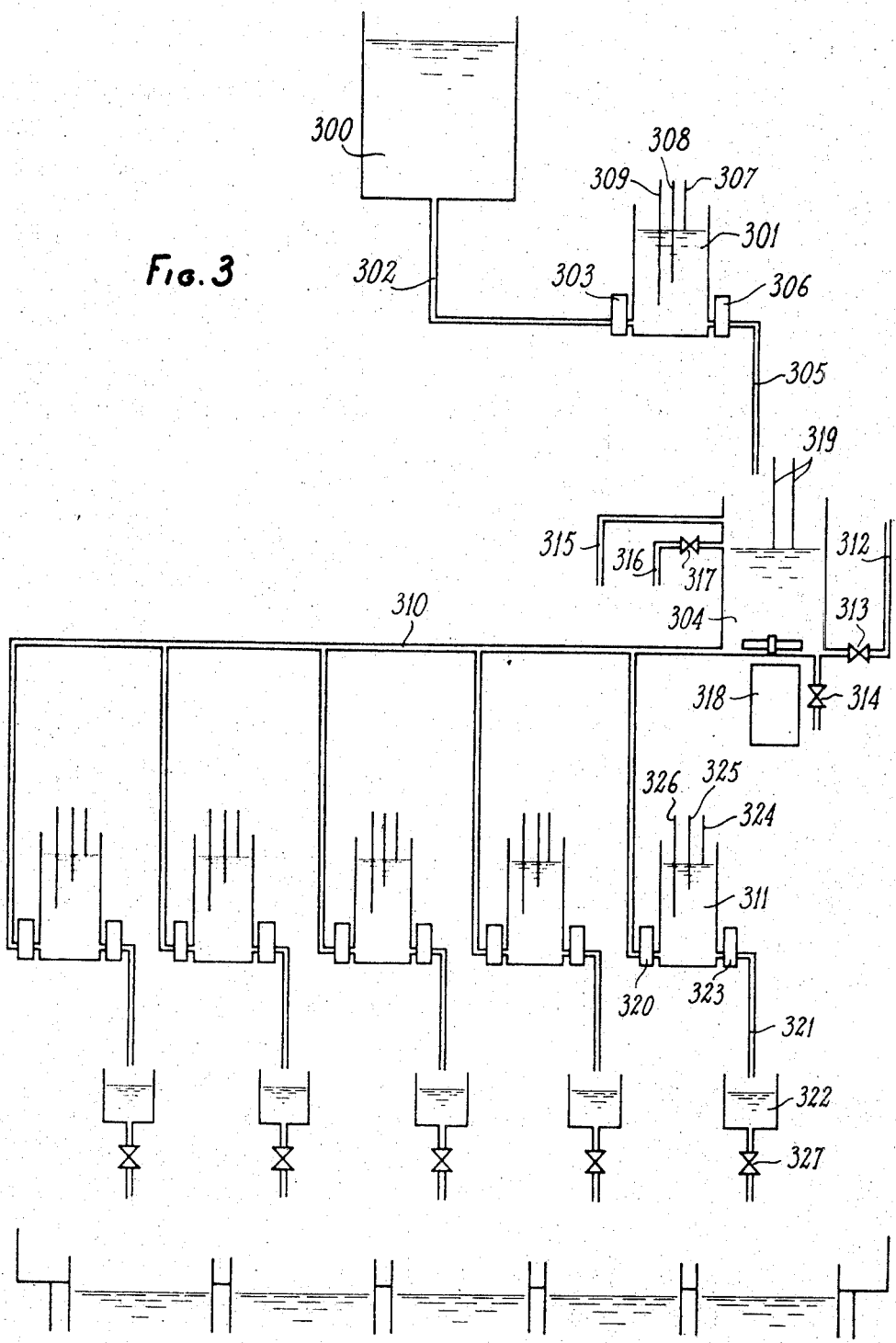
FIG. 3 illustrates in detail the assembly 106 of means for storing and metering the coagulant reagent.

For storing and metering the coagulant reagent the apparatus further comprises, as shown in FIG. 3, a reagent storage tank 300 in which the reagent is kept in concentrated form in order on the one hand to ensure a long period of self-operation of the device without resorting to prohibitive vessel capacities, and on the other hand to permit the use of reagents such as aluminum sulfate, which cannot be preserved in the solution form unless it is concentrated. However, the actual proportioning thereof is performed with the product in the diluted state, in order to obtain a sufficient precision in the quantity ot injected reagent. To this end, the apparatus comprises a device for automatically diluting the solution, which comprises:

A concentrated solution proportioning device 301 connected to the storage basin via a pipe line 302 comprising a solenoid-operated valve 303 and communicating via a pipe line 305 controlled by another solenoid-operated valve 306 with a dilution vessel 304. This proportioning device 301 is designed for gauging and injecting into the dilution vessel a quantity of reagent which is adjustable to a constant value. To this end, it may comprise for example two electrodes, one 307 disposed at the upper portion of the proportioning device and controlling the filling level by its position, and another 308 disposed at the lower portion of the vessel for determining the draining level thereof. A third electrode 309, also submerged, is provided for closing the electric circuit in this case. The use of electrodes is advantageous, according to this invention, in that it permits of controlling automatically at the proper time the filling and draining of the proportioning device.

A dilution vessel 304, comprising a pipe 310 for supplying diluted solution to said proportioning devices 311, another pipe 312 for supplying dilution water which is equipped with an automatically controlled valve 313, a draining pipe equipped with a valve 314, two overflow pipes 315, 316 disposed at different levels, the last one 316 being disposed at the lower level being provided with a valve 317 controlled automatically. An agitator 318, for example of the magnetic type, is associated with this vessel which, according to the present invention, is advantageously equipped with a pair of electrodes 319 for automatically controlling at the proper time the presence of dilution water in the vessel.

Devices 311 for proportioning the diluted solution of coagulant reagent, which are equal in number to said stirring devices 103, each proportioning device 311 being adapted to inject reagent in a separate stirring device 103 and being equipped with a pipe line 310 through which it receives diluted reagent solution from the vessel 304, this pipe line 310 being equipped with a cut-off, solenoid operated valve 320, and with a line 321 for injecting the metered reagent into a transfer basin 322 via a circuit-controlling, solenoid operated valve 323. It comprises three electrodes 324, 325, 326 having the same functions as those described in connection with the concentrated solution proportioning device 301.

The transfer basins 322, aqual in number to said proportioning devices 311, each basin being associated with a predetermined proportioning device and comprising a valve 327, preferably of the full-flow sleeve-type controlled by means of compressed air with the assistance of a solenoid-operated valve. By using this basin it is possible to inject at one go and rapidly, into the stirring device, the requisite amount of reagent delivered thereto by the proportioning device 311 in the form of a plurality of successive doses of which the sum corresponds to said requisite amount, as explained hereinafter in the description of the mode of operation of the apparatus. In fact, experience teaches that the results of the flocculation and their reproductibility are greatly influenced by the manner in which the coagulant reagent is injected, and that the best results are obtained by injecting rapidly and at one go the quantity of reagent for which the flocculation test is performed.

The automatic performance of the various operations constituting a flocculation test is obtained (FIG. 4) by means of an electrical control cabinet 400 comprising:

A general programmer 401 driven by a synchronous motor and controlling the sequence of operations necessary for carrying out a flocculation test;

A secondary programming unit 402, 403 and 404 for preparing the diluted reagent solution and injecting same at increasing doses into the stirring devices;

Three timing devices 405, 406 and 407 for setting the times of the water and reagent mixing step, of the flocculation and of the decantation, these times being of course advantageously adjustable;

An electronic circuit plate 408 for controlling the various levels in the basins, vessels and proportioning devices;

Another electronic circuit plate 409 associated with the turbidimeter;

A computer 410 for determining the range of operation of the apparatus and delivering a signal of electrical or pneumatic type proportional to the added amount of reagent calculated as constituting the optimum treatment rate.

In the last paragraph hereinabove the term "range of operation of the apparatus" denotes the amounts of coagulant reagent for which a flocculation test is carried out during a cycle.

The above-described apparatus operates automatically as explained hereinafter:

The water of which it is desired to determine the optimum treatment rate is fed permanently to the apparatus into the basin 200 (FIG. 2) from which, outside the "tapping" periods, it flows to the sewer via overflow device 201. One function of this basin is to remove any air contained in the water under pressure before its ingress into the apparatus, for this air by adhering in the form of minute bubbles to the flocculated particles would impair considerably the decantation and thus alter the results of the tests. At the tapping moment controlled by the programmer 401 (FIG. 4) the valves 210 controlling the supply of water to the stirring devices 203 (FIG. 2) are opened together with the valves 214 inserted in the lower overflow pipe lines and controlling the filling level of these stirring devices. This operation is continued during a time sufficient to ensure a proper filling of the stirring devices. At the same time, the programmer 401 controls:

The starting of a first secondary programmer 402 for preparing a diluted solution of coagulant reagent.

This programmer controls in succession:

The opening of the automatic valve 313 supplying clean water from the constant-level basin 231 to the vessel 304 in which the concentrated reagent is diluted. During this operation, the automatic valve 317 inserted in the overflow pipe line is opened, and reclosed only shortly after closing the valve 313, in order positively to warrant the filling of this basin with the requisite volume of dilution water;

The opening of solenoid-operated valve 303 inserted at the inlet of proportioning device 301 for supplying same with concentrated reagent from the storage vessel 300. When the normal filling level of this proportioning device is attained, the electrode 307 controls automatically the closing of solenoid-operated valve 303.

The opening of solenoid-operated valve 306 to permit the injection of concentrated reagent into the dilution vessel 304. This valve is reclosed automatically when the electrode 308 is submerged. This electrode is advantageously adjustable in the vertical position for setting at the desired predetermined value the quantity of reagent utilized and therefore the concentration of diluted solution. During this time, the agitator 318 is started for homogeneizing the solution.

At the end of each one of the above-described operations, the electrodes 319 permit of controlling the presence of water in vessel 304, and electrodes 307, 308 and 309 the presence of reagent in proportioning device 301 and its proper injection into vessel 304. In case of faulty operation (thus detected automatically) the apparatus is stopped and an alarm is actuated.

After a predetermined homogeneization time, the starting of the second secondary programmer 403 which controls:

The opening of solenoid-operated valves 320 for causing the proportioning devices 311 to communicate with the vessel 304 containing the diluted reagent. When the filling of these proportioning devices, at the level preset by the position of electrodes 324, is completed, the solenoid-operated valves 320 are closed automatically. Each proportioning device will thus contain the same quantity of diluted reagent.

The opening of solenoid-operated valves 323 to permit the injection of reagent into the transfer basins 322, these solenoid-operated valves 323 closing automatically when the electrodes 325 are submerged.

The positions of the electrodes in the different proportioning devices are so adjusted that each transfer vessel receives the same amount of reagent corresponding to a dose $r$ injected into the water ($r$ = mg/liter).

In an apparatus comprising, say, five stirring devices, the necessary five flocculation tests are carried out during each cycle by using increasing doses of reagent according to an arithmetic progression of reason $r$. This dose $r$ is set at the desired value, for example 5 mg/liter or 10 mg/liter, by properly adjusting the position of electrodes 325.

This filling and draining operation performed on the proportioning devices in the transfers vessels 322 is repeated automatically as many times as required for attaining in each device a treatment rate inferior by $r$ to the minimum treatment rate $t$ multiple of $r$, which is determined as explained hereinafter by the computer; this rate being applied to the water in the first stirring device.

Upon completion of these operations, the third secondary programmer 404 controlling, in the manner explained in the foregoing, the filling and draining of the proportioning devices 311 in transfer vessels 322, is started. This operation is performed once in the case of the first proportioning device, twice in he case of the second proportioning devices, three times in the third, and so forth, n ... times in the $n^{th}$ proportioning device. Therefore, the transfer vessels receive amounts of reagents $t, t+r, t+2r \ldots t+(n-1)R$, respectively.

During each filling and draining operation carried out in these proportioning devices any failure is detected by the electrodes 324, 325 and 326 which stop the apparatus and release an alarm device in case of abnormal operation.

Then the main programmer 401 controls in succession:

The opening of the automatic valves 327 for injecting reagent into the stirring devices;

The starting at high speed, during a time period controlled by timing device 405, of the agitators 205 in order to ensure a proper dispersion of the reagent in water;

The starting at low speed, during a time period controlled by timing device 406, of agitators 205 for producing the desired flocculation;

The stoppage of these agitators during a time period controlled by timing device 407 in order to permit the decantation of the resulting flock.

The opening of the automatic valve 216 in order to remove from the stirring devices the supernatant water (above the precipitate) so as to transfer this water into the storage vessels 217.

The starting of agitators 218 for preventing, according to a characteristic feature of this invention, a second decantation of the water samples tapped from stirring devices 203.

In order to improve the operation of the apparatus, and according to a preferred form of embodiment of the present invention, only one turbidimeter is used for measuring the turbidity of all the samples of decanted water, this implying, in order to keep at the same value all the decantation times of these water samples in the stirring devices, the use of as many basins 217 as there are stirring devices 203 in the apparatus, these basins acting as storage reservoirs before transfering the water samples to the turbidimeter.

The opening of valve 220 to permit, via pipe line 219, the filling of basin 226 of turbidimeter 221 with decanted water from the first storage reservoir 217. Since according to this invention the volume of the basin is less than that of reservoir 217, there is a certainty of obtaining a complete filling of this basin.

The turbidity measurement is memorized in the form of an analogue electric signal in computer 410.

The setting into operation of computer 410 which compares automatically the turbidity values memorized therein order to detect the minimum value.

Now two cases may arise:

1. This minimum value corresponds to the optimum treatment rate T; in order words, in this case, the water in the stirring devices treated with a lower rate has a higher turbidity, and the water treated with a higher treatment rate has an equal or higher turbidity. An electric or pneumatic signal proportional to T is then delivered by the computer 410 and may be recorded or fed directly to the device for proportioning the coagulant reagent in the treatment plant, so that the amount of reagent introduced into the untreated water corresponds to the optimum treatment rate.

According to an original feature characterizing this invention, said computer, after each control cycle, sets the value of the minimum treatment rate $t$ to which the water in the first stirring device is to be treated, with due consideration for the detected value of the optimum treatment rate T, so that there is a constant tendency to apply the optimum treatment rate T to the intermediate stirring device according to the equation $$T = t + r(n-1)/2$$

wherein $n$, an odd number, designates the number of stirring devices. Thus, for instance, in the case of an apparatus comprising five stirring devices, the optimum treatment rate will have to be obtained in the third device. With this arrangement it is possible to follow the trend of the possible evolution of this optimum treatment rate and therefore to ascertain its value very rapidly in case of modification.

2. This minimum turbidity value does not correspond necessarily to the optimum treatment rate, which applies in case said value was found for water from the 1st or $n^{th}$ stirring device. According to the process described hereinabove, the computer will automatically modify, for the next test, the value of the minimum treatment rate $t$ of $\pm r(n-1)/2$, according as the minimum turbidity value was found for the $n^{th}$ or the 1st stirring device. With this method, the computer will therefore also tend to cause the value of the optimum treatment rate to correspond to the one applied to the water of the stirring device of order $(n-1)/2$. In the specific example considered herein of an apparatus with five stirring devices, the minimum treatment rate is modified by an amount corresponding to $\pm 2r$ in order constantly to obtain the best flocculation in the 3rd stirring device.

The computer 410 advantageously comprises a manually-operated device adapted, when the apparatus is started, to display the optimum treatment rate T determined manually at the laboratory. In this case, the water in the first stirring device will be treated with the minimum rate $t$ corresponding to $$T - r(n-1)/2.$$

The draining of the vessel 304 containing dilute reagent by opening the automatic valve 314 to prepare said vessel for another preparation of diluted reagent during the next cycle.

The draining of stirring device 203 from the precipitate and water not tapped therefrom, by opening the automatic drain valves 211.

The rinsing of the stirring devices 203 with raw or untreated water and from bottom to top, up to the overflow devices 212, by opening the valves 210. This rinsing step may be carried out by using clean water, but according to this invention it is preferable to perform same with raw water in order to prevent any subsequent dilution of this raw water with clean water, as this would unduly alter the next measurement.

The rinsing, also from bottom to top, with clean water, of the storage vessels 217 by opening the valves 223.

The rinsing, still from bottom to top, by using clean water, of the basin 226 of the turbidimeter, by opening the valve 230.

The draining of the stirring devices 203, storage vessels 217 of the basin of turbidimeter 226, by opening the valves 211, 220 and 228.

Then the apparatus may resume according to the same sequence of operations another control cycle.

The apparatus according to this invention may also be utilized with liquids other than water, by using suitable reagents and rinsing liquid.

Although this invention has been described with specific reference to a particular form of embodiment thereof, it will readily occur to those conversant with the art that various modifications and changes may be brought thereto without departing from the spirit and scope of the invention as set forth in the appended claims.

What is claimed is:

1. An apparatus for the automatic determination of the optimum proportion of the coagulant reagent to be added to a liquid to obtain clarification of said liquid by coagulation of the colloidal materials in suspension comprising means for storing said liquid to be examined, a plurality of mixing, floculation and decantation containers, means for leading the liquid to be examined into said containers, a storing capacity for the coagulant reagent, means for diluting said coagulant reagent, means for proportioning said coagulant reagent when diluted one time, means for leading to said mixing, floculation and decantation containers a proportioned quantity of said coagulant reagent in dilution form, a turbidimeter connected for measuring successively the turbidity of the supernatant liquid in each container for the mixing, floculation and decantation, calculating means connected for registering and comparing the value of the turbidity of the supernatant liquid in each container and finally determining the optimum value of the quantity of diluted reagent to be introduced into the liquid to be treated.

2. An apparatus according to claim 1 wherein means are provided for storing the diluted and proportioned solution of said coagulant reagent, said means comprising a storing capacity in a number equal to that of said mixing, floculation and decantation containers, said capacity being provided with detection electrodes for the level reached in each capacity by the coagulant reagent diluted and proportioned.

3. An apparatus according to claim 1 wherein capacities for storing the supernatant liquid in the mixing, floculation and decantation containers is provided, said storing capacities being in a number equal to that of said containers, means for leading the supernatant liquid in each of said containers to the corresponding storage capacity and means for leading to a turbidimeter the liquid introduced into each storing capacity.

4. An apparatus according to claim 1 wherein the means for diluting the coagulant reagent and for proportioning such reagent comprises a capacity provided with electrodes designed to control the level reached by the coagulant reagent and by said coagulant reagent once diluted.

5. An apparatus according to claim 1 wherein an enclosure surrounds said containers for the mixing, floculation and decantation and an enclosure surrounds said storing container for the supernatant fraction coming from each of said containers, means for leading to each of said two enclosures a flow of liquid secured from said liquid before examination.

6. An apparatus according to claim 1 wherein a capacity is provided for the liquid to be examined formed by a tank at constant level and provided with detection electrodes of the level reached by the liquid in said capacity.

7. An apparatus according to claim 1 wherein means are provided leading to the bottom of the containers for mixing, floculation and decantation of the raw water to be treated, means for storing the cleaning water led to the base of a storage container connected to said containers and means leading to the lower portion of the tank of said turbidimeter said cleaned water for washing said containers and said tank.

8. In an apparatus according to claim 1 wherein the mixing, floculation and decantation containers number five, said containers being equipped with agitation means having two rotation speeds.

9. An apparatus according to claim 1 wherein calculation means are provided for determining automatically the quantity of reagent to be added to the liquid of the mixing container which receives the smallest proportion of the reagent so that for n containers receiving an increasing proportion of reagent, the rate of optimum treatment tends always to be injected into the container in the ratio $(n+1)/2$.

10. In an apparatus according to claim 1 wherein complementary storing dilutions proportions and injections are provided in the mixing containers of the reagent completing the coagulant action, aiding the floculation and/or correcting the pH for example.

* * * * *